United States Patent
Lindeborg et al.

(10) Patent No.: US 6,735,210 B1
(45) Date of Patent: May 11, 2004

(54) TRANSMIT QUEUE CACHING

(75) Inventors: Carl John Lindeborg, Shrewsbury, MA (US); James Scott Hiscock, Rockport, MA (US); David James Mannion, Northboro, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/507,256

(22) Filed: Feb. 18, 2000

(51) Int. Cl.[7] .............................................. H04L 12/56
(52) U.S. Cl. ..................... 370/412; 370/401; 370/395.7
(58) Field of Search ................................ 370/412, 413, 370/414, 415, 417, 428, 229, 230, 231, 389, 395.1, 395.7, 395.71, 395.72, 400, 401, 419, 392

(56) References Cited

U.S. PATENT DOCUMENTS

| | | | |
|---|---|---|---|
| 6,141,323 A | * 10/2000 | Rusu et al. .................. | 370/236 |
| 6,405,258 B1 | * 6/2002 | Erimli et al. ................ | 709/235 |
| 6,487,212 B1 | * 11/2002 | Erimli et al. ................ | 370/413 |
| 6,504,846 B1 | * 1/2003 | Yu et al. ..................... | 370/412 |
| 6,542,507 B1 | * 4/2003 | Khacherian et al. ... | 370/395.43 |

\* cited by examiner

*Primary Examiner*—Brian Nguyen
(74) *Attorney, Agent, or Firm*—McGlew and Tuttle, P.C.

(57) ABSTRACT

A computer network switch includes a receiving module for receiving packets, a packet memory with a plurality of buffer cells with each of the buffer cells having a buffer descriptor. A descriptor free pool lists available buffer descriptors that can be used for new incoming packets. A plurality of transmit queues hold the buffer descriptors. Each of the transmit queues include an input queue, an expansion queue and an output queue. The switch also includes control logic for directing the removing of one of the available buffer descriptors from the free pool and directing one of the packets from the receiving module into one of the buff cells corresponding to the one available buffer descriptor. The control logic places the one buffer descriptor in the input queue of one of the transmit queues. The control logic also monitors a load status of the input and output queues.

30 Claims, 6 Drawing Sheets

TRANSMIT QUEUE CACHING

FIELD OF THE INVENTION

The present invention relates in general to computer network devices which selectively direct packets among a plurality of ports, and in particular to such a device where packets are queued using two different types of memory.

BACKGROUND OF THE INVENTION

In network switch devices, incoming packets must be sent out on different ports. The speed or rate at which packets arrive is not always equal to the speed or rate at which packets can be sent out. This occurs for various reasons such as different types of links delivering and removing the packets from the network switch at different rates, and different speeds of operation of the devices at the other end of the link. The rate of packet flow also various widely because of such factors as how busy the devices on the other end of the link are, and the operations being performed by these devices. When the incoming rate of packets is larger than the outgoing packet rate, packets can be lost. The end devices must then re-request these packets. This increases the overall communication time for a message across the network, and increases the traffic across the network. An increase in traffic increases the likelihood of incoming rates being higher than outgoing rates, which then increases the likelihood of more dropped packets.

In order to reduce the likelihood of dropped packets, and to take advantage of the widely varying packet transfer rates, buffers are used to temporarily store or cache the packets. When the incoming rate is larger than the outgoing rate, the extra packets are stored in a buffer. Subsequently, when the outgoing rate is higher than the incoming rate, the excess packets are removed from the buffer. The larger the buffer, the larger the incoming rate can be than the outgoing rate, and the longer this inequality can exist without losing packets. The larger the packets, the larger is the expense, and the larger is the size of the memory.

In network switch products today there is a new emphasis on providing quality/class of service. Network devices will need to classify and mark packet streams with the required quality/class of service. Therefore computer network switches will be required to have more buffers per port. This increases the amount of memory needed for buffering the input and output rates to avoid lost packets. This increase in the amount of memory also increases the cost and space required for network switches. The nature of computer network communication, and packet transfer, makes it desirable to provide the buffers in memory devices having fast access times.

SUMMARY AND OBJECTS OF THE INVENTION

It is a primary object of the present invention to provide a buffer for packets which has a fast access time, and uses two different types of memory devices in order to reduce the size and cost of computer network switches and/or increase buffer size and efficiency.

The computer network switch includes a receiving module for receiving a plurality of packets, and determining a type (port and/or class) of each of the packets. A packet memory includes a plurality of buffer cells receiving the plurality of packets from the receiving module. Each of the buffer cells has a buffer descriptor identifying a respective buffer cell. A descriptor free pool lists available buffer descriptors that can be used for new incoming packets. A plurality of transmit queues hold the buffer descriptors in a first in first out order for the transmission queuing of their respective buffer cells and respective packets. Each of the transmit queues corresponding to one of the types of packets, and each transmit queue includes an input queue, an expansion queue and an output queue.

The switch also includes control logic for directing the removing of one of the available buffer descriptors from the free pool and directing one of the packets from the receiving module into one of the buffer cells corresponding to the one available buffer descriptor. The control logic places the one buffer descriptor in the input queue of one of the transmit queues corresponding to the type of the one packet.

The control logic also monitors a load status of the input and output queues for each of the transmit queues and selectively directs a flow of the buffer descriptors from the input queue to either the expansion queue or the output queue. In particular, the control logic directs the flow of buffer descriptors to the expansion queue when a load status of the input and output queues are above a predetermined load or threshold.

When the load is below the determined load, usually a lower packet rate than the combined capacity of the input and output queues, the control logic directs the packets directly from the input queue to the output queue. When the load is above the predetermined load level, the control logic directs the buffer descriptors from the input queue to the expansion queue, and then to the output queue.

The input and output queues are preferably formed using SRAM type memory devices because of their fast access time. The expansion memory is preferably formed from DRAM type memory devices because of their respective higher memory density. The control logic also preferably sets the predetermined load level, and controls the packet transfer, so that packets can be delivered to the expansion queue in a burst write, and packets can be removed from the expansion queue in a burst read. This averages out the read and write time to prevent significant slowing of the buffer descriptors though the transmit queue.

A transmit module controls the plurality of ports for transmitting the packets onto the computer network. Each of the transmit queues for each port corresponds to at least one of the types of packets. The transmit module removes a first out buffer descriptor from the output queue of one transmit queue and removes the packet from the buffer cell corresponding to the first out buffer descriptor.

The descriptor free pool can also include an input queue, and expansion queue and an output queue. When a buffer descriptor is needed, the control logic removes a buffer descriptor from the output queue of the free pool. When the transmit queue is finished with a buffer descriptor, the control logic directs the buffer descriptor to the input queue of the descriptor free pool. The control logic monitors the load level of the queues in the descriptor free pool. When the load level is above a predetermined level, the control logic directs buffer descriptors from the input queue to the expansion queue, and then to the output queue. When the load level is below a predetermined level, the control logic directs buffer descriptors directly from the input queue to the output queue.

The control logic is also able to adjust the size of the expansion queue. This is very helpful in customizing a network switch. Different users may have different needs and therefore a particular destination may receive more packets of a particular class than other classes, or other users. As an example, one destination may be receiving predominantly time sensitive packets such as streaming audio or video, while another destination may be receiving predominantly time insensitive packets, such as file transfers and email. The present invention allows the input and output queues to be of a minimum size to maintain the fast access times with the size of the expansion queues to be variable to adjust for the needs of the user. This allows for efficient allocation of memory in response to varying needs of the users, and an economical computer network switch in terms of cost and size.

Most next generation network switches will be designed to support quality of service (differentiated services). Quality of service is required to support applications such as voice over IP and video streaming. The support of differentiated services requires many more queues per port. This invention provides a low cost, flexible implementations of a large quantity of queues.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
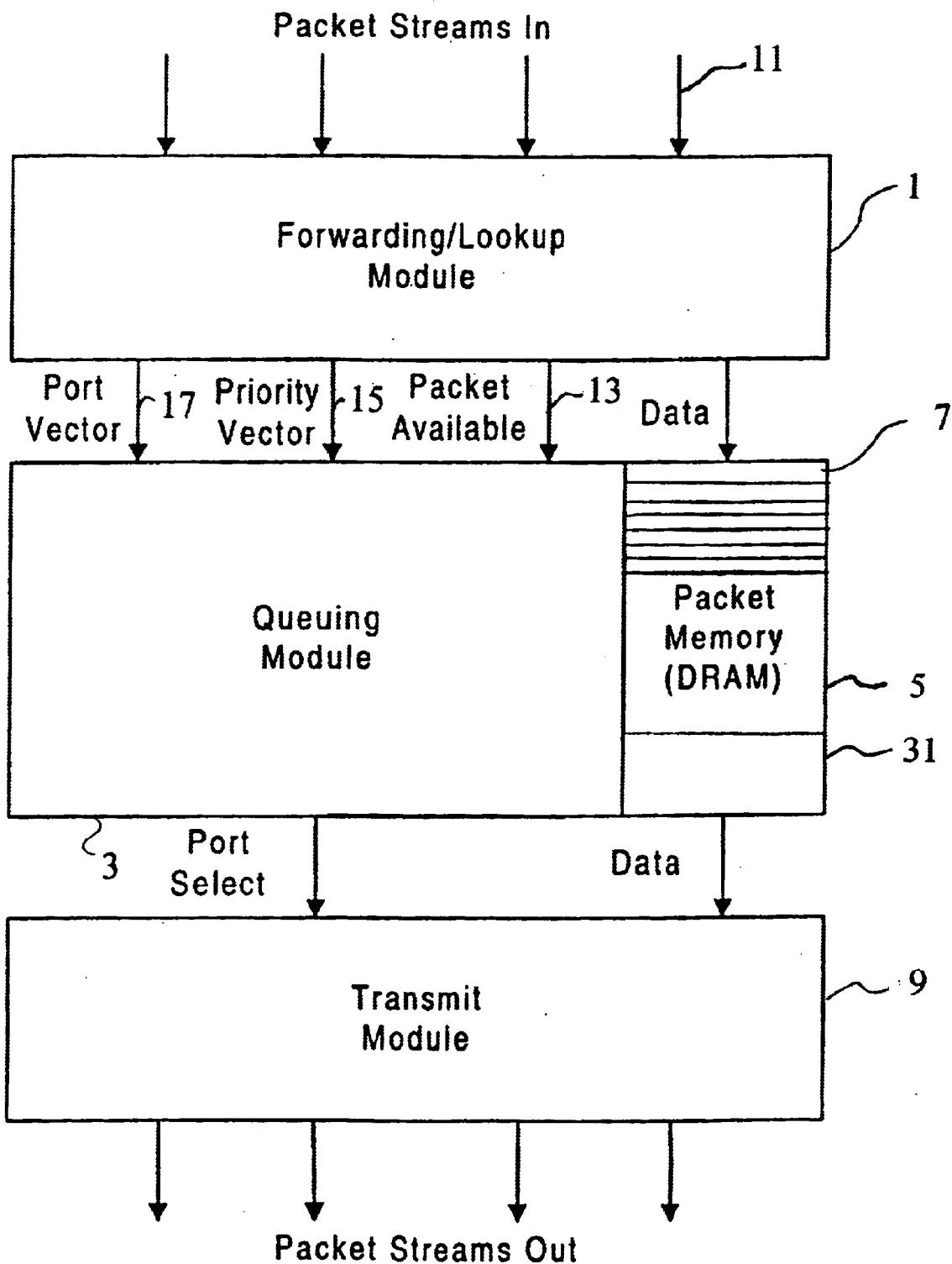
FIG. 1 is a schematic diagram of the forwarding subsystem in a network switch.

Referring to the drawings, and in particular to FIG. 1, a typical packet forwarding subsystem within a network is shown. The Forwarding Subsystem is composed of a Forwarding/Lookup Module 1, a Queuing Module 3, a Packet Memory 5, and a Transmit Module 9. Packet streams 11 flow into the Forwarding/Lookup Module 1. The Forward/Lookup Module 1 determines which if any destination ports should receive a copy of each packet.

In network switch products providing quality/class of service the forward/lookup module classifies and marks packet streams with the required quality/class of service. Quality/class of service indicates throughput, packet latency, and jitter parameters. Class of service and Forwarding/Lookup information is used to place each packet in an appropriate port/class transmit queues. The Forward/Lookup module 1 provides these functions by indicating packet availability 13, port vector 17 and class/priority vector 15 to the Queuing Module 3. The queues are serviced in such a manner that the negotiated quality/class of service is maintained.

The Queuing Module 3 stores packets in Packet Memory or buffer 5. The packet memory or buffer 5 includes a plurality of buffer cells 7 which hold the individual packets or portions of packets that are larger than a buffer cell. The queuing module 3 maintains buffer descriptors which identify the packet and the location of the buffer cell 7 in which the Packet has been stored. The queuing module 3 sends a copy of the packet to destination ports via the Transmit Module 9. The Queuing Module 3 stores a copy of the buffer descriptors in each port/class transmit queue 19 as specified by the Forwarding/Lookup Module 1. The Queuing Module 3 scans transmit port/class queues for packet availability and algorithmically fetches buffer descriptors from the port/class queues 19. The Queuing Module 3 moves copies of the packet via the Transmit Module 9 to the appropriate destination port.

Figure 2:
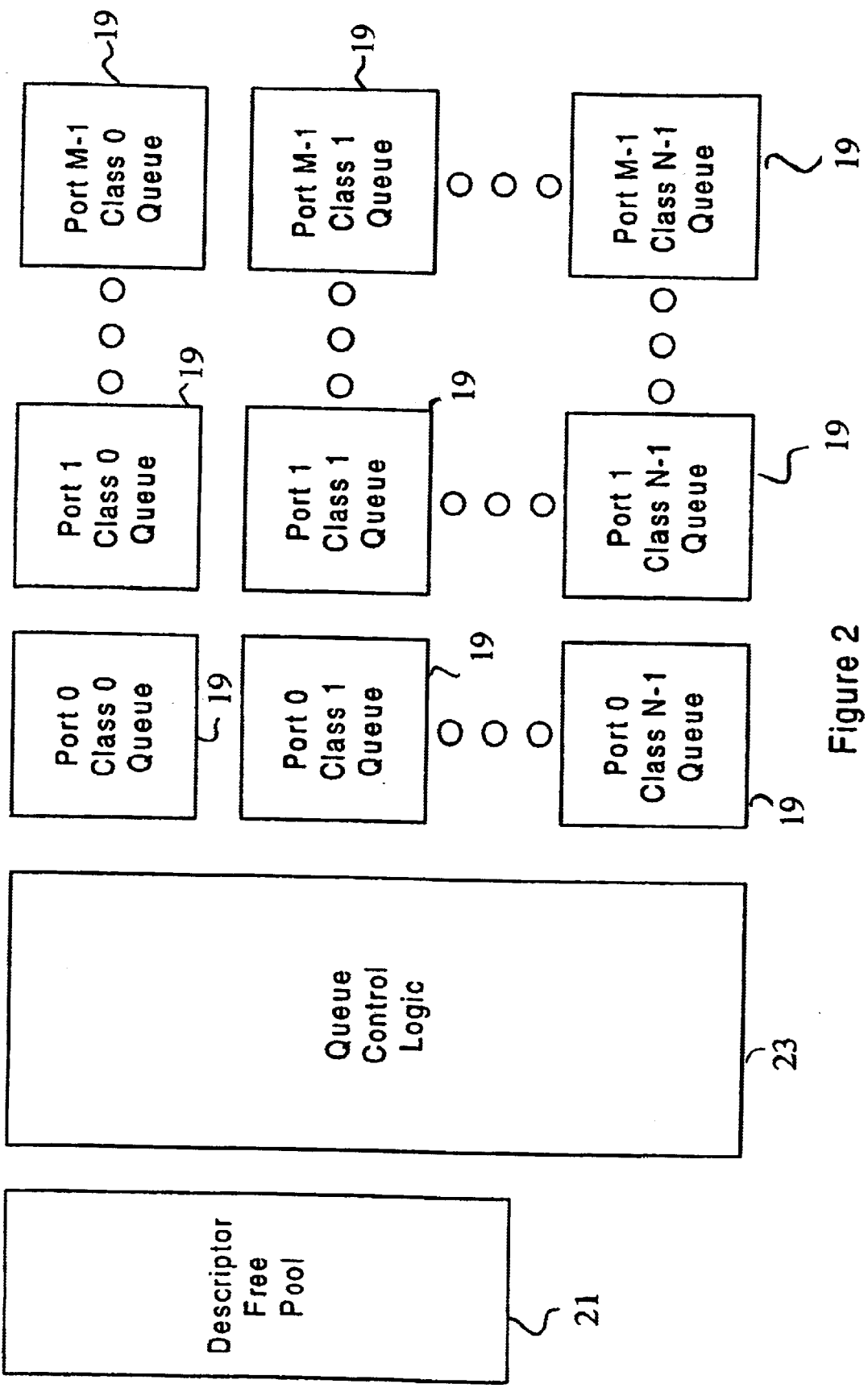
FIG. 2 is a block diagram of the individual components in the queuing system.

FIG. 2 shows buffer descriptor structures in the Queuing Module 3, in particular a Descriptor Free Pool 21, Port/class Transmit Queues 19, and associated Queue Control Logic 23. The Descriptor Free Pool 21 uses a FIFO (first in first out) structure. Free Pool descriptor entries are initialized with pointers to unique regions of Packet Memory which are then considered the buffer cells 7. Queue Control Logic 23 reads the Free Pool 21 to obtain a buffer descriptor. The Queue Control Logic 23 returns buffer descriptors to the Free Pool 21 when the queue control logic 23 determines that all copies of the associated packet have been sent to destination ports.

Each port/class transmit queue 19 uses FIFO structures. When the Forwarding/Lookup Module 1 has a packet to move to Packet Memory 5, the Queue Control Logic 23 writes the buffer descriptor, associated with the buffer cell 7 storing that packet, to the appropriate port/class transmit queues 19. The Forwarding/Lookup Module 1 specifies transmit port/class queues 19 with a port/class vector 17, 15.

The Queue Control Logic 23 scans the port/class queues 19 for packet availability. Following a service algorithm, the Queue Control Logic 23 reads buffers descriptors from an individual port/class queue 19. The Queuing Module 3 then moves a copy of the packet in the associated buffer cell. 7 to a destination port via the Transmit Module 9.

The Queue Control Logic 23 must access port/class transmit queues 19 and the Free Pool 21 on each packet that is moved in and out of Packet Memory 5. Low latency to these structures is required. For performance and cost considerations, Forwarding Subsystems and the associated Queuing Modules 3 are implemented in ASIC technology. SRAM structures are used to implement Free Pools 21 and Transmit Queues 19 as they provide relatively dense storage and fast access. There exists a trade off between queue depth and the cost of implementation. Greater queue depth provides greater buffer elasticity. Greater buffer elasticity allows the Forwarding Subsystem to absorb bursts of packets that are destined for the same port/class, and thus reduces the probability that a packet will be dropped. Unfortunately, larger queues mean greater silicon real estate and that translates to increased ASIC cost.

Previous network switches were implemented with one or two priority/classes per port. New generations of network switches requiring 8 or more classes per port to support quality/class of service (such as IETF differentiated services) can be serviced by the present invention. The total SRAM/queue capacity requirements have jumpedx4–x8.

Larger SRAM capacity drives up ASIC area/cost. Larger SRAM content also presents problems for internal ASIC routing as SRAM blocks many routing layers. Another drawback of SRAM queue implementations is that queue sizes are fixed. The new generation of network switches and their emphasis on quality of service further exacerbates the problem.

Figure 3:
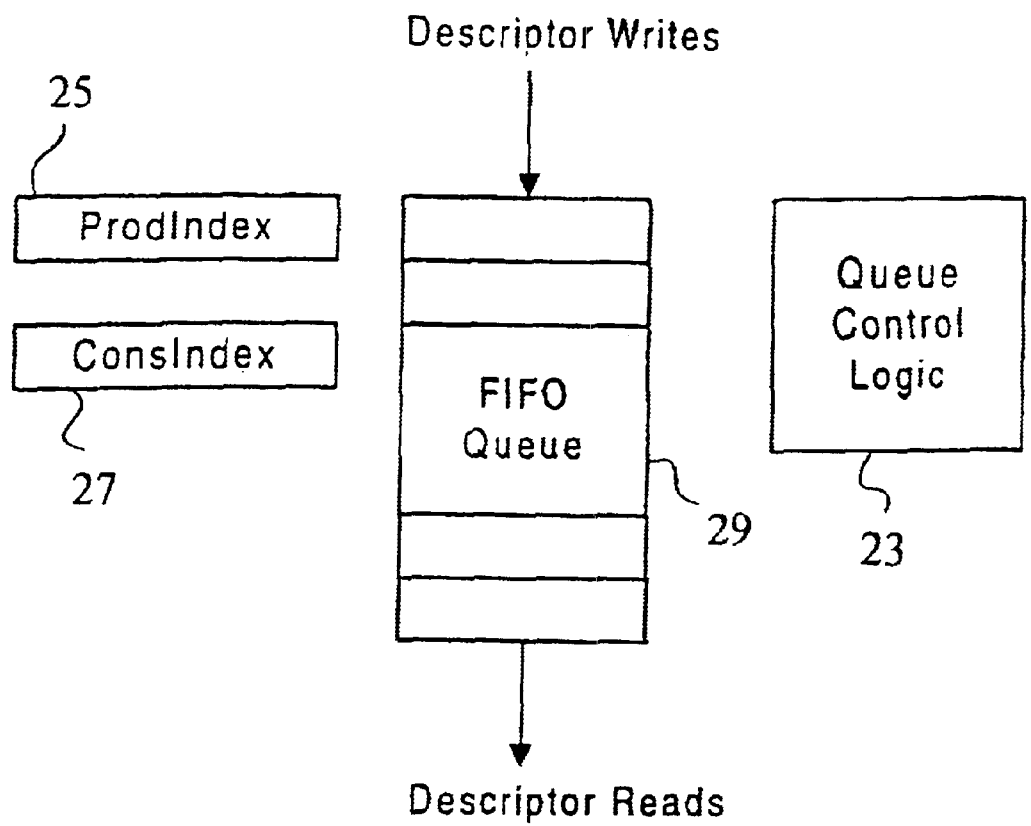
FIG. 3 is a block diagram of a transmit queue having a single unit queue.

FIG. 3 shows a simple implementation of a SRAM queue. Consumer and Producer Pointers 27, 25 are used to address the SRAM 29 as a FIFO. Control logic 23 manages the state of the FIFO.

Preferred queue capacity for network edge devices is 64 K bytes of data buffering per port/class queue 19. This provides sufficient buffering for a single user session. The preferred buffer cell size is 256 bytes, which is considered a good trade off between efficient use of packet memory 5 (granularity) and the number of buffer descriptors needed to represent a maximum length packet. Total queue capacity per port/class is 256 buffers (64 K bytes/256 bytes per buffer cell=256 buffer cells). If a network switch has 40 ports and 8 priorities/port, the total number of transmit queue buffer descriptor locations 34 their associated buffer descriptors is 80,000.

Preferred queue capacity for Core devices is on the order of 1 Mbyte of data buffering per port/class queue. This provides sufficient buffering for many user sessions. Using 256 byte buffer cells, a 40 port/8 class device will require 1.2 M transmit queue buffer descriptor locations 34 and their associated buffer descriptors.

Transmit Queue Caching, provides a solution for large queuing requirements which maintain the fast access time of SRAM based queues, provides flexible allocation of buffer descriptors and the associated main data storage area, while reducing/maintaining silicon area and its associated cost and implementation issues. Reducing/maintaining silicon area also facilitates product designs that support larger numbers of port/class queues 19 and/or greater buffer elasticity.

Figure 4:
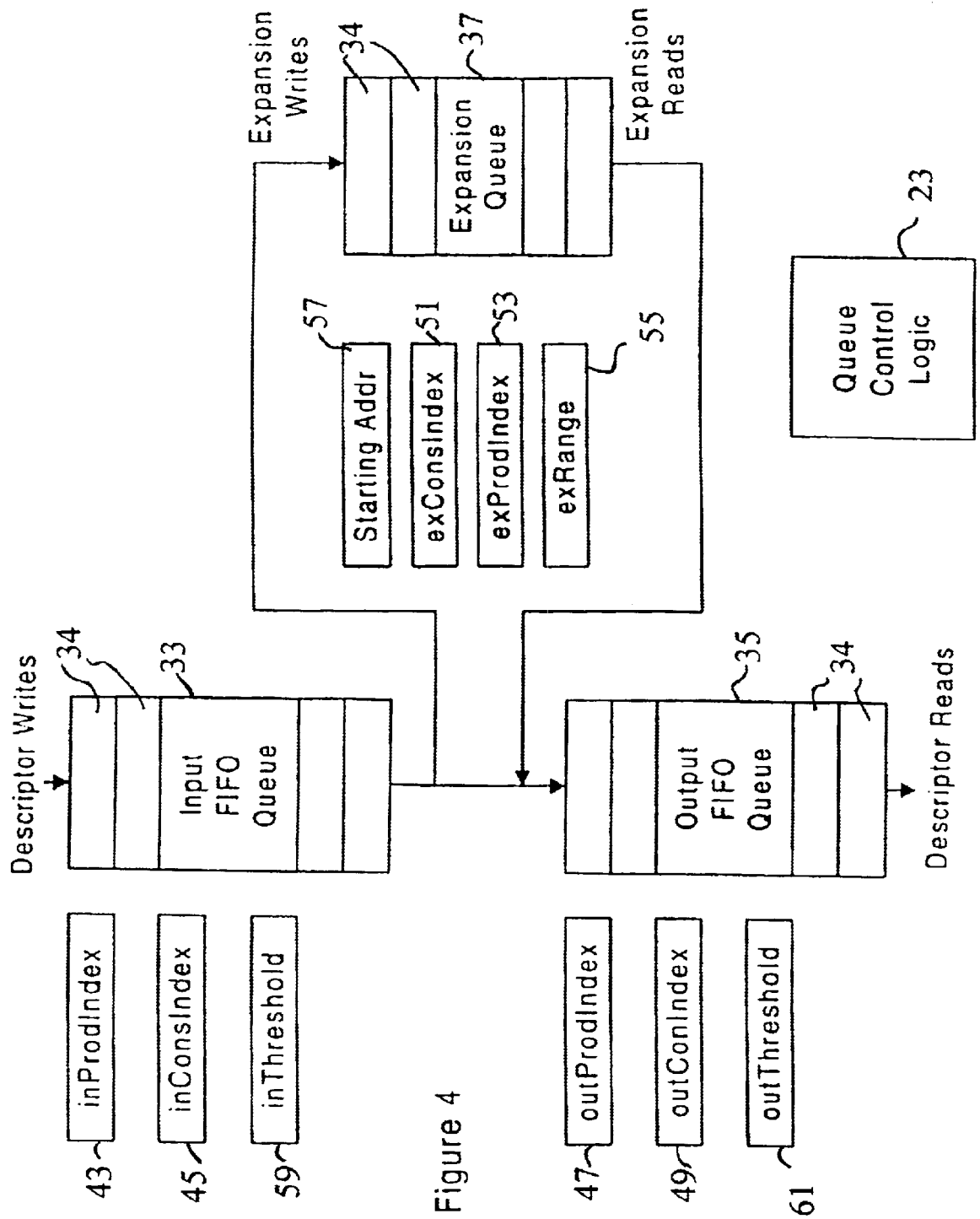
FIG. 4 is a block diagram of a transmit queue having separate input, expansion and output queues.

FIG. 4 shows a block diagram of a cached port/class transmit queue. The concept of transmit queue caching is to implement transmit queues with very small SRAM FIFO's 29, large DRAM storage 31, and the control logic 23 to maintain queue integrity. The DRAM storage is preferably provided as part of the packet memory, but could be physically separate. Small SRAM FIFOs, similar to those SRAM FIFO's 29 in FIG. 3, form I/O queues 34 and 35, and provide a low latency interface for each port/class transmit queue 19. The large DRAM storage area 31 is a common resource providing expansion area for each port/class transmit queue 19. Control logic 23 manages the transfer of port/class transmit queue entries between SRAM type FIFO's and DRAM type expansion memory. The Control logic 23 uses programmable parameters to optimize queue performance.

The SRAM type FIFO for each port/class transmit queue 19 is composed of independent Input and Output FIFO's 33, 35. Buffer Descriptors, as determined by Forwarding/Lookup logic, are written to the Input FIFO 33. Port transmit logic reads buffer descriptors from the Output FIFO 35 as packets are transmitted. An expansion queue 37 selectively receives the buffer descriptors from the input queue 33, and delivers buffer descriptors to the output queue 35.

Figure 5:
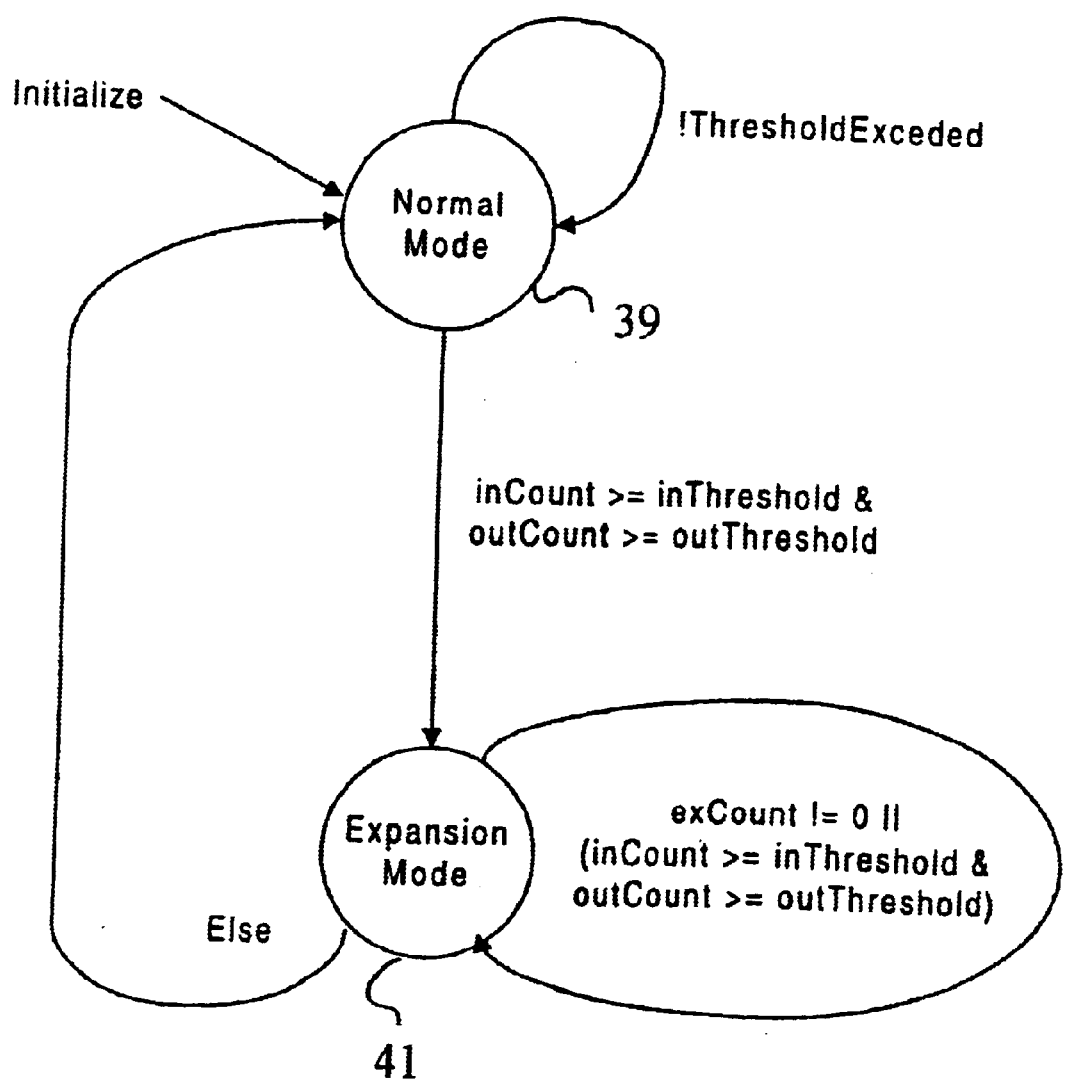
FIG. 5 is a queue state diagram for a transmit queue according to the present invention.

FIG. 5 illustrates the queue state machine for each of the transmit queues 19. Upon initialization, the port/class queue state is in "Normal Mode" 39. In "Normal Mode" 39 queue entries flow directly from the Input FIFO 33 to the Output FIFO 35. Generally, when the queue is lightly loaded, the queue state remains in "Normal Mode". When operating thresholds 59, 61 are exceeded, the queue state moves to "Expanded Mode" 41. Queue entries are directed differently in expanded mode 41.

Entries are read from the Input FIFO 33 and written to the expansion queue 37 in DRAM type memory. Outgoing entries from the expansion queue 37 are read from the DRAM type memory and written to the Output FIFO 35. When there are entries in the expansion queue 37, all queue entries or buffer descriptors flow to the Output FIFO 35 flow from the expansion queue 37. When the expansion queue 37 is empty and threshold conditions in the Input and Output FIFO are satisfied, the queue state will return to "Normal Mode" 39. Direct flow of entries/buffer descriptors from the Input queue 33 to the Output queue 35 will resume.

When queue control logic 23 determines that an entry or buffer descriptor should be placed on a port/class transmit queue 19, and space for that entry is available, the entry is written to the Input FIFO 33. This is independent of queue state.

In "Normal Mode" 39, control logic reads queue entries/buffer descriptors from the Input FIFO queue 33 and writes those queue entries/buffer descriptors to the Output FIFO queue 35. In "Expanded Mode" 41, control logic 23 reads queue entries/buffer descriptors from the Input FIFO queue 33 and writes those queue entries/buffer descriptors to expansion queue 37. To support efficient DRAM operations, the queue control logic 23 will typically wait until there are sufficient entries in the Input FIFO 33 to support a burst write operation to the expansion queue 37. In Expanded Mode 41, the queue control logic 23 will typically wait until there is sufficient room in the Output FIFO 35 to support a burst read operation from the expansion queue 37.

The network switch will typically have transmit logic which is shared between all ports and their respective quality/class of service queues 19. Each time a port/class transmit queue 19 is serviced by the transmit logic, an entry is read and removed from Output FIFO 35 of that transmit queue 19.

Input queues 33 and Output queues 35 for each Cached Transmit port/class queue 19 require no more than 16 locations each, or 32 locations in total. Additional overhead is required for the small input and output FIFO consumer pointers 45, 49, producer pointers 43, 47, and control logic. The expansion pointer length would differ between Edge and Core device implementations.

Total SRAM requirements for a 40 port/8 class device of the present invention is 12,800 locations. Most of the queue capacity in the present invention resides in DRAM.

Performance customized configurations are easily supported. Specific ports and priorities, and the applications may be given custom buffer allocations. For example, ports connected to servers and other shared applications would benefit from additional buffer elasticity. This is accomplish by allocating a larger expansion block of DRAM type memory for the respective expansion queue 37.

Control logic 23 associated with each port/class transmit queue 19 must address a unique block of memory in DRAM memory 31 for it's expansion queue 37. Each expansion block can be configured for optimal performance. The size of each expansion area may be programmed as a range parameter. To provide for the most efficient use of expansion DRAM, the starting address 57 is also configurable. Together the starting address 57 and range parameters 55 specify unique areas in expansion DRAM. 31.

Since DRAM is much denser than SRAM, by approximately 4–6 times, the number of total transmit descriptor entries can be quite large without increasing space. Allocation of descriptors can be customized per port and per class. The starting address 57 and depth or range 55 of the expansion queue 37 may be configured at initialization.

The Transmit Queue Caching concept also is used in the Descriptor Free Pools 21. Each Free Pool 21 would consist of two small independent SRAM FIFO memories, similar to those SRAM FIFO's 29 in FIG. 3, which serve as the I/O interface to the queue control logic 23. This provides fast access when fetching and returning buffer descriptors to the descriptor free pool 21. The Input of the descriptor free pool 21 is written with buffer descriptors when those buffer descriptors are returned to the Free Pool 21 by the queue control logic 23. The Output queue of the descriptor free pool is read when the queue control logic 23 fetches buffer descriptors.

Figure 6:
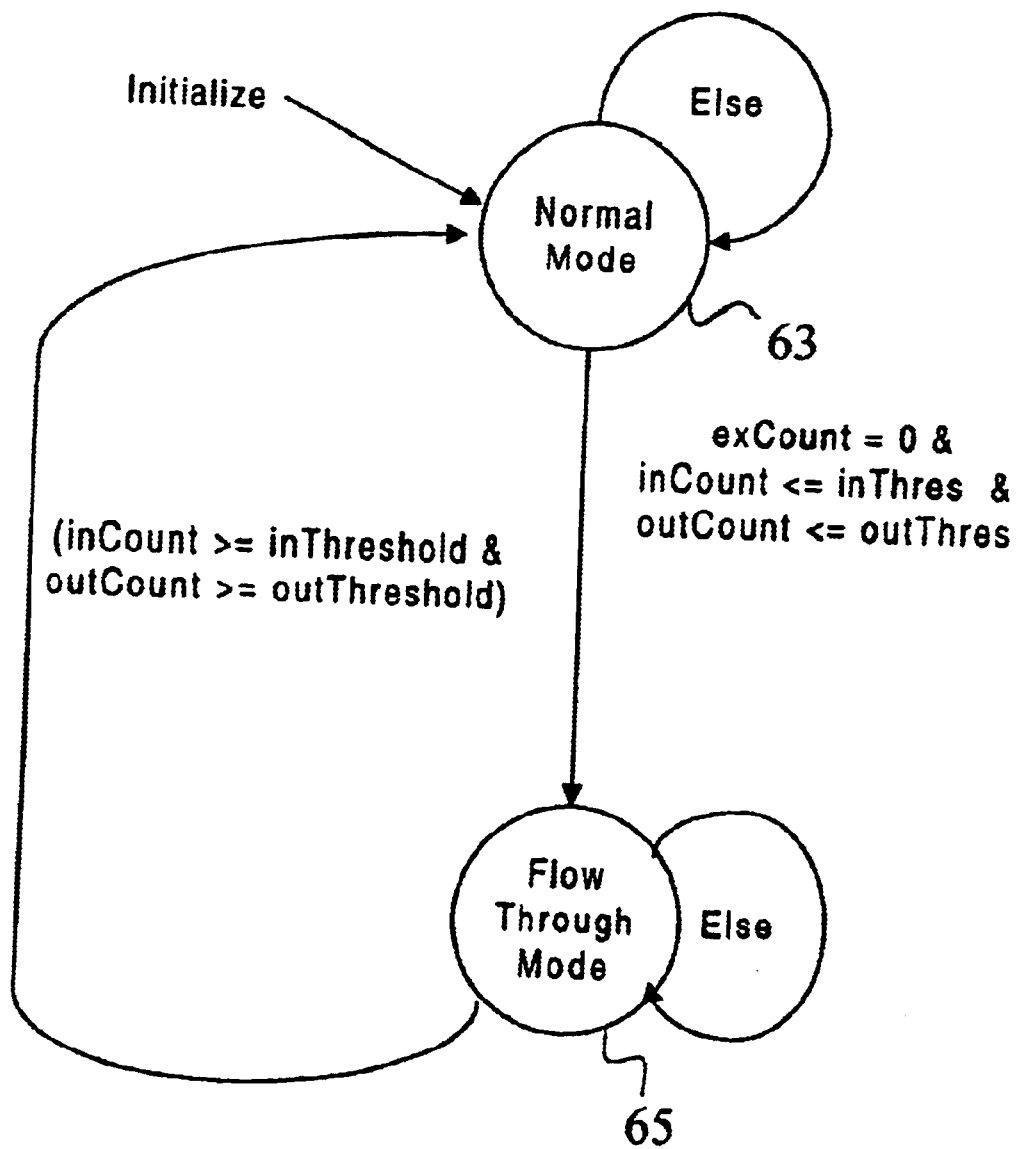
FIG. 6 is a queue state diagram for a free pool of the present invention.

FIG. 6 illustrates the Free Pool state machine. Upon initialization, the Free Pool state is said to be in "Normal expansion Mode" 63. The Input and Output queues of the descriptor free pool 21 are empty and the Expansion queue contains all initialized buffer descriptors. In order to facilitate efficient transfers from DRAM, the control logic will typically wait for sufficient space to perform a burst operation. In "Normal expansion Mode" 63, control logic moves buffer descriptors to the Output FIFO when sufficient space is available. Control logic will move buffer descriptors from Input FIFO to expansion DRAM when a sufficient quantity is available.

If the Expansion queue should become empty, the Input and Output queues are below thresholds, the Free Pool control logic moves to "Flow Through Mode" 65. In "Flow Through Mode" 65 buffer descriptor entries are read from the Input FIFO and written directly to the Output FIFO. When the threshold are exceeded, the free pool control logic returns to "Normal Expansion Mode".

As the Free Pool expansion queue may be placed in any portion of the DRAM 31, the starting address of this area is configured. The size of the Free Pool may be configured as a range parameter.

Transmit Queue Caching maintains SRAM FIFOs as I/O ports for control logic. DRAM density allows port/class transmit queues 4–6 times greater capacity than SRAM in the same silicon area (cost). Greater capacity/queue density allows for a greater number of port/class queues 19 to support applications that require quality of service. Greater capacity also provides greater bandwidth elasticity. As the parameters of the DRAM based expansion areas are configurable, Transmit Queue Caching allows bandwidth elasticity to be assigned to individual port/class queues 19. Further, the Queue Caching technique may be extended to provide the same silicon area savings to the associated Free Pool.

The implementation of the Expansion queue 37 has been targeted as being formed in DRAM 31 in this invention. However many technology alternatives exist. Expansion Memory could be implemented with embedded ASIC or external DRAM. Expansion Memory for both the transmit queues 19 and the descriptor free pool 21 could share the same physical memory as Packet Memory 5. Expansion Memory could be implemented with embedded or external SRAM.

While specific embodiments of the invention have been shown and described in detail to illustrate the application of the principles of the invention, it will be understood that the invention may be embodied otherwise without departing from such principles.

What is claimed is:

1. An electronic queuing system comprising:
an input queue receiving and delivering buffer descriptors using a first in first out procedure, said input queue being implemented in a first type of electronic memory;
an expansion queue receiving and delivering the buffer descriptors using a first in first out procedure; said expansion queue selectively receivable of the buffer descriptors from said input queue, said expansion queue using a second type of electronic memory;
an output queue receiving and delivering the buffer descriptors up a first in first out procedure, said output queue selectively receivable of the buffer descriptors from said input queue and said expansion queue, said output queue using a third type of electronic memory, said second type of memory being denser than said first and third types of memory;
control logic for monitor a load status of said input and output queues and selectively directing a flow of the buffer descriptors from said input queue to one of said expansion queue and said output queue, said control logic directing said flow of the buffer descriptors to said expansion queue when a load status of said input and output queues are above a predetermined load.

2. The system in accordance with claim 1, wherein:
said control logic monitors a load status of said expansion queue;
said control logic directs said flow of the buffer descriptors from said input queue to said output queue when a load status of said input queue, said expansion queue and said output queue is below another predetermined load.

3. The system in accordance with claim 1, wherein:
said expansion queue delivers the buffer descriptors to said output queue when said input queue is in a mode of delivering the buffer descriptors to said expansion queue.

4. The system in accordance with claim 1, wherein:
said expansion queue receives the buffer descriptors in a burst write operation to said expansion queue.

5. The system in accordance with claim 1, wherein:
said expansion queue delivers the buffer descriptors in a burst read operation from said expansion queue.

6. The system in accordance with claim 1, wherein:
a speed of said second memory type is slower than oe of a speed of said first memory type and a speed of said third memory type.

7. The system in accordance with claim 1, wherein:
said first and third memory types are substantially identical.

8. The system in accordance with claim 1, wherein:
said control logic selectively controls a size of said expansion queue.

9. The system in accordance with claim 1, further comprising:
a plurality of said input queues in a first memory device, each of said plurality of input queues receiving and delivering the buffer descriptors for only one packet type;
a plurality of said expansion queues in a second memory device, each of said plurality of expansion queues receiving and delivering the buffer descriptors for only one of said packet types;
said control logic selectively controlling a size of said plurality of expansion queues in said second memory device.

10. The system in accordance with claim 1, wherein:
said first and third types of memory are SRAM memory, and said second type of memory is DRAM memory.

11. A computer network packet forwarding device comprising:
a receiving module for receiving a plurality of packets, said receiving module determining a type of each of the packets;

a packet memory including a plurality of buffer cells receiving the plurality of packets from said receiving module, each of said buffer cells having a buffer descriptor identifying a respective said buffer cell;

a descriptor free pool listing available said buffer descriptors;

a plurality of transmit queues, each of said transmit queues corresponding to one of said types of packets, each said transmit queues including an input queue, an expansion queue and an output queue;

control logic for removing one of said available buffer descriptors from said free pool and directing one of said packets from said receiving module into one of said buffer cells corresponding to said one buffer descriptor, said control logic placing said one buffer descriptor in said input queue of one of said transmit queues corresponding to said type of said one packet, said control logic monitoring a load status of said input and output queues of said one transmit queue and selectively directing a flow of buffer descriptors from said input queue to one of said expansion queue and said output queue, said control logic directing said flow of buffer descriptors to said expansion queue when one of a load status of said input queue and a load status of said output queues is above a predetermined load.

12. The device in accordance with claim 11, further comprising:

a transmit module including a plurality of ports for transmitting packets onto a computer network, each of said ports corresponding to at least one of said types of packets, said transmit module removing a first out buffer descriptor from said output queue of said one transmit queue and removing a first out packet from said buffer cells corresponding to said first out buffer descriptor, said transmit module transmitting said first out packet from one of said ports corresponding to said type of said first out packet;

said receiving module receiving said packets from the computer network.

13. The device in accordance with claim 11, wherein;

said expansion queue uses a memory with a greater density than a memory used by said input and output queues.

14. The device in accordance with claim 11, wherein:

said expansion queue uses a memory with a slower speed than a memory used by said input and output queues.

15. The device in accordance with claim 11, wherein:

said control logic monitors a load status of said expansion queue;

said control logic directs said flow of buffer descriptors from said input queue to said output queue when a load status of said input queue, said expansion queue and said output queue is below another predetermined load.

16. The device in accordance with claim 11, wherein:

said expansion queue receives the buffer descriptors in a burst write operation to the expansion queue.

17. The device in accordance with claim 11, wherein:

said expansion queue delivers the buffer descriptors in a bust read operation from the expansion queue.

18. The device in accordance with claim 11, wherein:

said control logic selectively controls a size of said expansion queue.

19. The device in accordance with claim 11, wherein:

is said input and output queues are formed in SRAM memory, and said expansion queue is formed in DRAM memory.

20. A computer network packet forwarding device comprising:

a receiving module for receiving a plurality of different type packets;

a packet memory including a plurality of buffer cells receiving the plurality of packets from said receiving module, each of said buffer cells having a buffer descriptor identifying a respective said buffer cell;

a descriptor free pool queue listing available said buffer descriptors, said descriptor free pool queue including an input queue, and expansion queue and an output queue;

a plurality of transmit queues, each of said transmit queues corresponding to one of said types of packets;

a transmit module receiving the packets from said packet memory;

control logic for removing one of said available buffer descriptors from said free pool queue and directing one of said packets from said receiving module into one of said buffer cells corresponding to said one buffer descriptor, said control logic placing said one buffer descriptor in said transmit queue corresponding to said type of said one packet, said control logic identifying a first out buffer descriptor from said one of said transmit queues and directing removal of a first out packet from said buffer cells corresponding to said first out buffer descriptor to said transmit module, said control logic directing said first out buffer descriptor to said input queue of said descriptor free pool, said control logic monitoring a load status of said input and output queues of said descriptor free pool queue and selectively directing a flow of buffer descriptors from said input queue to one of said expansion queue and said output queue, said control logic directing said flow of buffer descriptors to said expansion queue when one of a load status of said input queue and a load status of said output queue is above a predetermined load.

21. An electronic queuing system comprising:

an input queue receiving and devlivering buffer descriptors using a first in first out procedure, said input queue being implemented in a first type of electronic memory;

an expansion queue receiving and delivering the buffer descriptors using a first in first out procedure; said expansion queue selectively receiving the buffer descriptors from said input queue, said expansion queue using a second type of electronic memory;

an output queue receiving and delivering the buffer descriptors using a first in first out procedure, said output queue selectively receiving the buffer descriptors from said input queue and said expansion queue, said output queue using a third type of electronic memory, said second type of memory being denser than said first and third types of memory;

control logic for monitoring a load status of each of said input and output queues and for selectively directing a flow of the buffer descriptors from said input queue to one of said expansion queue and said output queue, said control logic directing said flow of the buffer descriptors to said expansion queue when the load status of each of said input and output queues is above at least a first predetermined load.

22. The system in accordance with claim 21, wherein:

said control logic monitors a load status of said expansion queue;

said control logic directs said flow of the buffer descriptors from said input queue to said output queue when a load status of said input queue, said expansion queue and said output queue is below at least a second predetermined load.

23. The system in accordance with claim 21, wherein:

said expansion queue delivers the buffer descriptors to said output queue while said input queue is delivering the buffer descriptors to said expansion queue.

24. The sytem in accordance with claim 21, wherein:

said expansion queue receives the buffer descriptors in a burst write operation to said expansion queue.

25. The sytem in accordance with claim 21, wherein:

said expansion queue delivers the buffer descriptors in a burst read operation from said expansion queue.

26. The sytem in accordance with claim 21, wherein:

the speed of said second memory type is slower than the speeds of both said first and third memory types.

27. The system in accordance with claim 21, wherein:

said first and third memory types are substantially identical.

28. The system in accordance with claim 21, wherein:

said control logic selectively controls the size of said expansion queue.

29. The system in accordance with claim 21, further comprising:

a plurality of said input queues in a first memory device, each of said plurality of input queues receiving and delivering the buffer descriptors for only one packet type;

a plurality of said expansion queues in a second memory device, each of said plurality of expansion queues receiving and delivering the buffer descriptors for only one of said packet types;

said control logic selectively controlling a size of said plurality of expansion queues in said second memory device.

30. The sytem in accordance with claim 21, wherein:

said first and third types of memory, and said second type of memory is DRAM memory.

* * * * *